United States Patent [19]
Taylor

[11] 4,057,112
[45] Nov. 8, 1977

[54] SUBSOIL PLOW
[75] Inventor: Quentin Taylor, Bethany, Ill.
[73] Assignee: Grain Systems, Inc., Assumption, Ill.
[21] Appl. No.: 705,150
[22] Filed: July 14, 1976
[51] Int. Cl.² ............ A01B 13/08; A01B 59/06; A01B 61/04
[52] U.S. Cl. ............ 172/166; 172/439; 172/699; 280/43.2; 172/419; 172/271
[58] Field of Search ............ 172/439, 699, 271, 451, 172/690, 691, 419, 248, 166; 280/43.2, 460 A, 415 A

[56] References Cited
U.S. PATENT DOCUMENTS

| | | | |
|---|---|---|---|
| 2,091,427 | 8/1937 | Brodersen | 172/413 |
| 2,209,083 | 7/1940 | Du Vall | 172/421 |
| 3,231,294 | 1/1966 | Horney | 172/439 X |
| 3,275,341 | 9/1966 | Ralston | 172/451 |
| 3,450,212 | 6/1969 | Sylvester | 172/699 |
| 3,472,528 | 10/1969 | Richey | 172/439 X |
| 3,559,747 | 2/1971 | Cline | 280/43.2 |

FOREIGN PATENT DOCUMENTS

| | | | |
|---|---|---|---|
| 1,111,208 | 10/1955 | France | 172/271 |
| 210,894 | 6/1909 | Germany | 172/419 |
| 641,744 | 8/1950 | United Kingdom | 172/699 |

*Primary Examiner*—Richard J. Johnson
*Attorney, Agent, or Firm*—Koenig, Senniger, Powers and Leavitt

[57] ABSTRACT

A subsoil plow having a plurality of forwardly facing C-shaped plow teeth arranged on a rigid frame in a generally V-shaped array. Each plow tooth has an upper portion, a curved shank portion, and a bottom tip and is mounted on the frame by a so-called pivot bolt located directly above the tip of the tooth and by a shear bolt spaced from the pivot bolt, the shear bolt being adapted to fail in shear upon application of a predetermined load to the plow tooth, such as may be occasioned upon the tooth striking an underground object as the plow is pulled through the field, so as to release the tooth and to permit it to swing upwardly and rearwardly about the pivot bolt without the tip of the tooth digging deeper into the ground.

Also disclosed is a hitch which enables the plow to readily be coupled to a tractor equipped either with a category 2 or 3N or a category 3 three point hitch with or without an automatic coupler.

9 Claims, 11 Drawing Figures

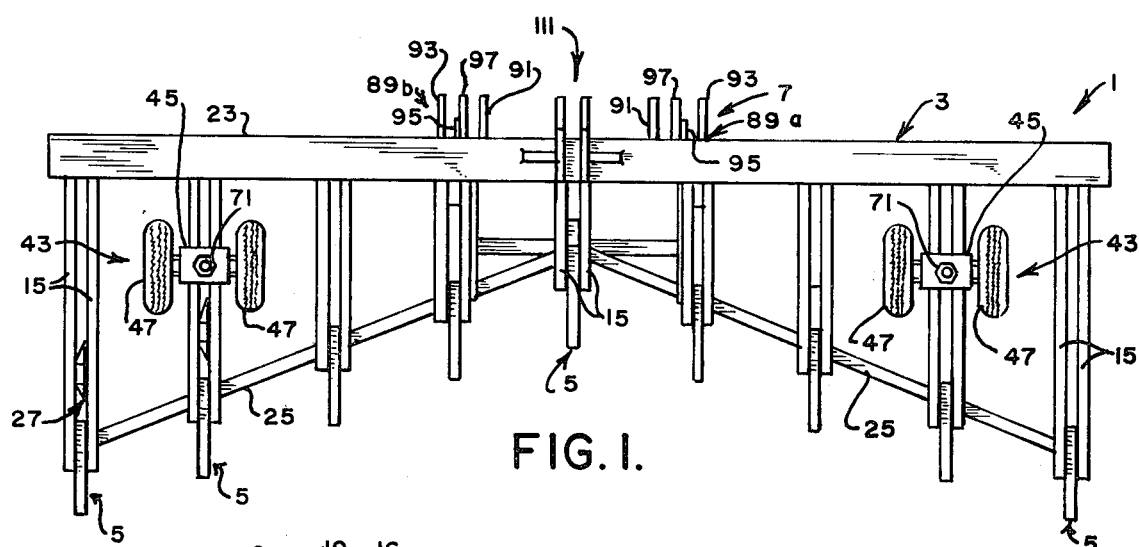

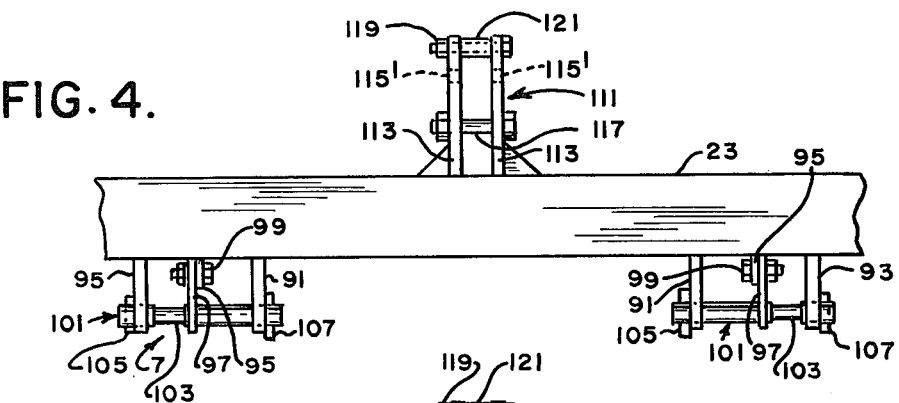
FIG. 4.
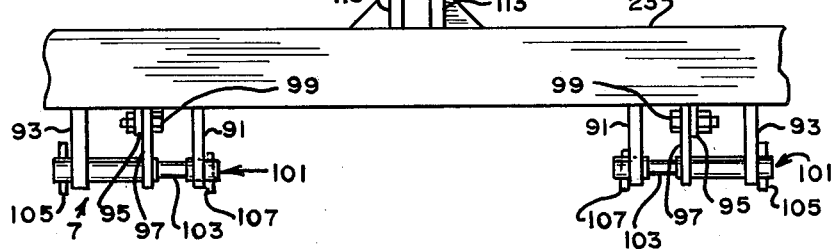
FIG. 5.
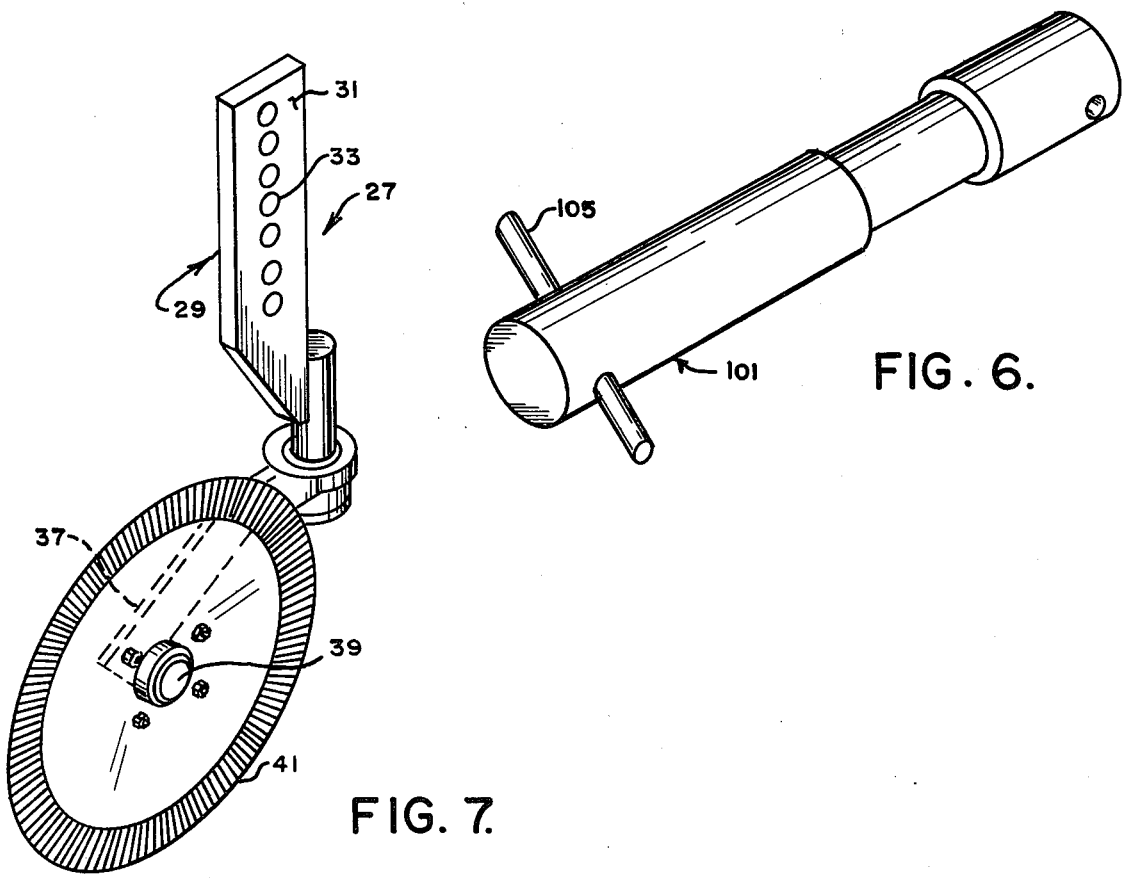
FIG. 6.
FIG. 7.

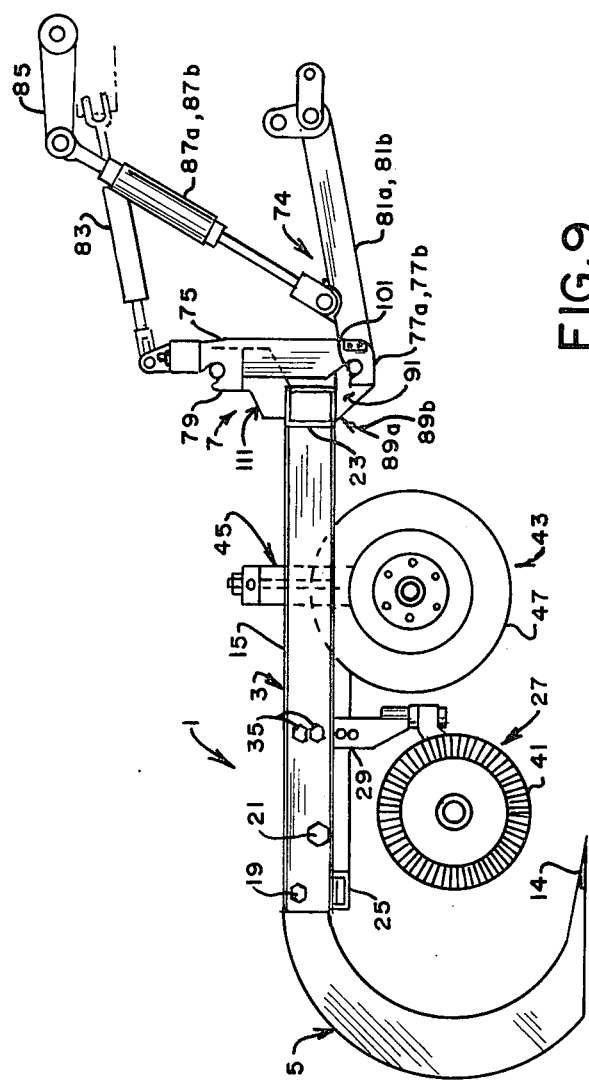
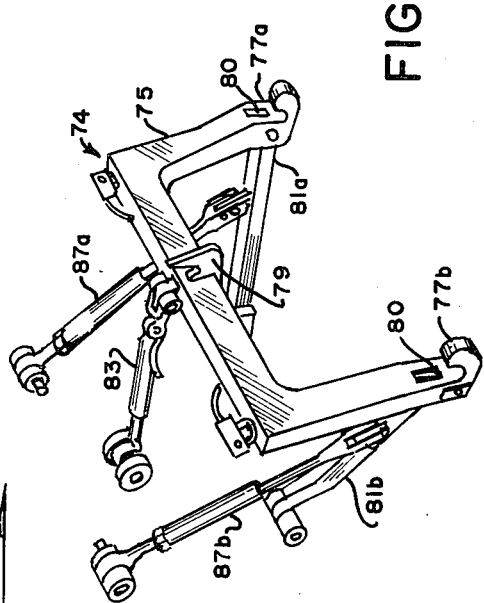
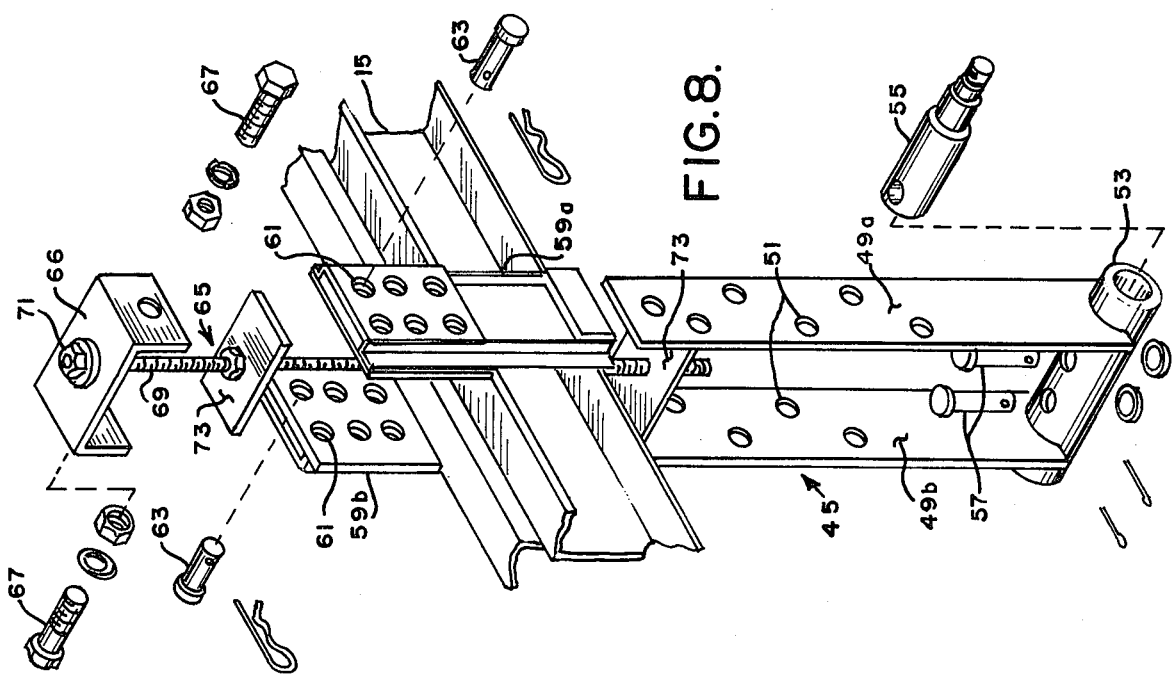

SUBSOIL PLOW

BACKGROUND OF THE INVENTION

Apparatus of the present invention relates to subsoil plow, and more particularly to a so-called subsoil chisel plow.

In recent years, subsoil plows have been used in arid regions to penetrate and to break up the soil to a depth much greater than conventional plows or other cultivating implements so as to better enable the soil to absorb and hold moisture. In non-arid regions, it has been found that repeated plowing with conventional moldboard plows only cultivates the top 10 inches (25.4 cm) of soil leaving the soil therebelow undisturbed. Repeated plowing year after year with moldboard plows maintains the top layer of soil well broken and aerated for the crops, but a hard pan or plow sole develops in the undisturbed subsoil. This plow sole does not readily absorb moisture and oftentimes acts as a moisture barrier which causes much moisture to run off the field. Also this hard plow sole prevents crops from sending down deep root systems. In short, it is only the cultivated top layer of soil which retains the majority of moisture for the crops and supports the crop root systems.

It is known that by using subsoil chisel plows or rippers which penetrate the ground to a much greater depth (for example, 16 inches or more) than conventional moldboard plows, this plow sole can be broken up. If a field is plowed with a subsoil plow in the fall after the crops have been harvested, winter rain and snow will percolate through the soil to fully soak the ground to a depth below the level of the plow sole and the crop root systems will readily penetrate the soil to a much greater depth. This increased amount of subsoil moisture and greater root depth of the crops has resulted in crops which are better able to withstand drought conditions.

Another advantage of a subsoil plow is that the subsoil plow may be relatively wide (e.g., having a width of up to 20 feet or more) and that by using a powerful tractor, the subsoil plow may be pulled through the field at a relatively high rate of speed. In conventional subsoil plows, the plow teeth are commonly secured to the plow frame by means of a shear pin or bolt so that in the event a plow tooth strikes an underground object (e.g., a rock), the shear pin will fail thus releasing the plow tooth so as to swing up out of the ground and to thus limit the maximum force applied to the plow tooth and to the plow. However, in conventional subsoil plows, the plow tooth must dig deeper into the ground after the shear pin fails as it swings to its retracted position thus placing great strain on the plow tooth and the plow frame which can result in damage thereto.

Also, tractors capable of pulling subsoil plows are conventionally equipped with either a category 2 or a category 3 three point hitch. These tractor hitches have been standardized so that any tractor having a category 2 hitch may be readily hitched to an implement designed for a category 2 hitch or any tractor having a category 3 hitch may be readily hitched to any category 3 implement. Many of these tractor hitches utilize a so-called automatic coupler which enables an implement to be hitched to the tractor without the driver leaving his tractor seat merely by backing the tractor up to the implement aligning the tractor hitch with the implement hitch, and engaging coupling hooks on the tractor hitch with the hitch pins on the implement. Generally, a category 3 hitch is wider than a category 2 hitch and is of more sturdy construction. Also, with the category 2 hitches, a larger diameter hitch pin on the implement must be used if the category 2 hitch is equipped with an automatic coupler. Oftentimes a farmer will own two or more tractors of sufficient size to pull an implement, but the tractors may have different hitches. Thus, with most conventional implements, only the tractor having the hitch for which the implement was designed may be used to pull the implement. One known implement hitch arrangement utilizes hitch pins held by brackets of sufficient length so that either a category 2 or category 3 tractor hitch may be coupled to the hitch pins. It has been found, however, that these relatively long hitch pins will bend when subjected to high loading as may be required to pull a large subsoil plow or other similar implement through a field at high speed.

Recently, a tractor hitch designated category 3N has been offered by John Deere & Company of Moline, Ill., and by other tractor manufacturers which combines the narrow width of a category 2 hitch with the greater height and strength of a category 3 hitch. The purpose of the category 3N hitch is to allow owners of a larger tractor equipped with the category 3 hitch to use implements intended for use with a category 2 hitch. Manufacturers of this category 3N hitch state that it may be necessary to drill an extra hole in the center implement hook hitch mast on the implement. Thus, owners of tractors equipped with a category 3 hitch still must buy the category 3N hitch to use category 2 implements with the tractor.

Reference may be made to U.S. Pat. Nos. 1,531,643, 2,209,083, 2,808,772, 3,450,212 and 3,559,747 showing various chisel plows or earth rippers in the same general field as the subsoil plow of the present invention.

SUMMARY OF THE INVENTION

Among the objects of this invention may be noted the provision of a subsoil chisel plow, such as above-described, which is adapted to deeply penetrate the soil so as to break up the soil to a depth much greater than may be achieved with conventional moldboard plows and deeper than many conventional chisel plows; the provision of such a subsoil plow which may readily be pulled by high-powered tractors at relatively high speeds without damage to the plow; the provision of such a subsoil plow which may be readily hitched to any tractor having a conventional category 2 or 3N or a category 3 hitch with or without an automatic coupler; the provision of such a subsoil plow which, in the event a plow tooth strikes an underground obstruction while plowing, permits the plow tooth to swing free of the obstruction without applying undue forces or twisting moments to the plow tooth or to the plow frame and thus prevents damage thereto; the provision of such a subsoil plow which does not become entangled in trash; the provision of such a subsoil plow having gauge wheels in which the screw jacks for adjusting the position of the gauge wheels are substantially free of loading as the gauge wheels roll on the ground as the plow is pulled through the field; and the provision of such a subsoil plow which is of rugged and economical construction and which is reliable in operation.

Briefly, a subsoil plow of this invention has a rigid frame, a plurality of plow teeth, means for mounting each of the plow teeth on the frame in a plowing position, and means for hitching the frame to a tractor or the like. The tractor is adapted to pull the plow through the field with the teeth penetrating the ground to a desired depth. Each of the plow teeth is a generally forwardly facing C-shaped member having an upper portion, a rearwardly and downwardly extending shank, and a bottom tip. The above-mentioned mounting means comprises a pair of frame members, one pair for each plow tooth, spaced for receiving the upper portion of its respective tooth. These frame members and the upper portion of the plow tooth are so structured as to receive a frangible safety release member (e.g., a shear pin or bolt) sized to fail in shear upon application of a predetermined load to the tooth as may be occasioned upon the tooth striking an object as the plow is pulled through the field, and a pivot fastener member located directly above the tip of the tooth so that in the event the tooth strikes an obstruction while the plow is being drawn through the field causing the frangible safety release member to fail, the tooth is free to rotate upwardly and rearwardly about the pivot fastener member out of the ground without the tip of the tooth moving below its normal plowing position.

Other objects and features of this invention will be in part apparent and in part pointed out hereinafter.

BRIEF DESCRIPTION OF THE DRAWINGS

FIG. 1 is a plan view of a subsoil plow of this invention;

FIG. 2A is an enlarged side elevational view of the plow tooth of this invention in its normal plowing position;

FIG. 2B is a view similar to FIG. 2A illustrating the plow tooth in its retracted position with the path of the tip of the tooth being illustrated by the dotted line as the tooth swings from its normal plowing position to its retracted position;

FIG. 3 is a perspective view of the plow of this invention with some parts omitted and with some parts shown in exploded relation;

FIG. 4 is an enlarged front view of the front portion of the plow frame showing an implement hitch adapted to be hitched to a tractor having either a category 2 or 3N three point hitch;

FIG. 5 is a view similar to FIG. 4 showing the implement hitch of FIG. 4 adapted to be hitched to a tractor having a category 3 three point hitch;

FIG. 6 is an enlarged perspective view of a hitch pin for use with the hitch illustrated in FIGS. 4 or 5;

FIG. 7 is an enlarged perspective view of a coulter wheel assembly for optional use with a plow of the present invention;

FIG. 8 is an exploded perspective view of an adjustable strut for securing a set of optional gauge wheels to the plow of the present invention;

FIG. 9 is a right side elevational view of the plow illustrating the relative position of the gauge wheels and the coulter wheels to a plow tooth and also illustrating the structure of either a category 2, 3N or 3 three point hitch; and FIG. 10 is a perspective view of a conventional three point tractor hitch.

Corresponding reference characters indicate corresponding parts throughout the several views of the drawings.

DESCRIPTION OF PREFERRED EMBODIMENTS

Referring now to the drawings, a subsoil or chisel plow of this invention, indicated in its entirety at 1, is shown to comprise a rigid frame 3 carrying a plurality, preferably an odd numbered plurality (e.g., 3, 5, 7, etc.), of plow teeth 5 in a normal plowing position (as shown in FIG. 2A). As indicated generally at 7, a hitch is provided at the front of the plow frame for attachment of the plow to a tractor or the like so as to enable the plow to be towed through a field by the tractor with the plow teeth penetrating the soil to a desired depth. Each plow tooth 5 comprises a planar, C-shaped member preferably of relatively thick steel plate or the like (e.g., a steel plate of 1 inch thickness or greater) having an upper portion 9 adapted for attachment to frame 3 in a manner as will appear, a rearwardly and downwardly extending shank 11 and a bottom tip 13. A replaceable wear tip or shoe 14 of hardened steel or the like is carried by the tip of each plow tooth to serve as a wear resistant member so as to prevent undue wear on the tip or shank of the plow tooth. As plow tooth 5 is pulled through the soil, shoe 14 penetrates the undisturbed soil and allows the inclined upper surface of the tooth to lift and break up the soil prior to encountering shank 11 thus making it easier for the shank to move through the soil. The horizontal bottom surface of the tooth rides freely on the soil.

Each plow tooth 5 is mounted between a pair of back-to-back channel members 15 constituting a portion of frame 3. The channel members comprising each pair are spaced from one another a distance for receiving or socketing the upper portion 9 of its respective plow tooth. The channels and the plow teeth are each provided with a pair of mating bolt holes 16 and 17 (see FIGS. 2A and 2B) for receiving a frangible safety release member or shear bolt 19 in hole 16, and for receiving a pivot fastener or bolt 21 in hole 17. Shear bolt 19 is so sized as to fail in shear upon application of a predetermined load to its plow tooth.

In accordance with this invention, pivot bolt 21 is located on a vertical line directly above the forwardmost tip of its respective tooth 5 (e.g., above the tip of shoe 14) so that in the event the tooth strikes an underground obstruction (e.g., a rock such as is shown in FIG. 2B) while being towed through the field which causes shear bolt 19 to fail, the tooth will rotate rearwardly and upwardly about pivot bolt 21 from its normal plowing position (as shown in FIG. 2A) to a retracted position (as shown in FIG. 2B) without tip 13 of the tooth moving below its normal plowing position (the path of the tip of the plow tooth being indicated by the dotted line in FIG. 2B as the tooth swings from its normal plowing position to its retracted position) and without the tip of the tooth digging deeper into the ground. It will be understood that by permitting the plow tooth to swing upwardly and rearwardly without the tip of the tooth digging deeper into the ground that the tooth and the plow frame are not subjected to undue twisting or lifting action which may cause damage to the tooth or the frame. It will be further noted that the pivot bolt 21 is of a larger cross section than shear bolt 19 thereby to insure that the shear bolt will fail prior to the pivot bolt upon the tooth encountering an underground obstruction.

As shown in FIG. 1, frame 3 includes a transverse front main beam 23. One of the pairs of channels 15 constituting a center pair is positioned on the longitudinal center line of the plow and extends rearwardly from beam 23 a distance substantially less than any of the other pairs of channels. The other pairs of channels are spaced equidistant from this center pair of channels with each of the other pairs of channels extending rearwardly from beam 23 a distance progressively longer than their adjacent inner pair of channels. The center pair of channels holds a first or center plow tooth in its normal plowing position adjacent beam 23 and the other teeth are preferably held in their normal plowing positions by their respective pairs of channels 15 in a generally symmetric V-shaped array (as viewed in FIG. 1) with the center tooth constituting the apex of the V-shaped array. The rear ends of the channels are braced by tie members 25 secured (e.g., welded) to the bottom faces of channels 15 at the rear ends thereof and these tie members angle inwardly and forwardly of the frame toward the center pair of channels. Thus, as viewed from above, frame 3 is defined by beam 23, outer channels 15 and braces 25 to be generally in the shape of a pentagon. While plow teeth 5 are preferably arranged in a V-shaped array, it will be understood that they may be arranged in a straight line either perpendicular or oblique to the direction of travel of the plow or in some other configuration, such as in part-circular array.

As generally indicated at 27, plow 1 of this invention is optionally provided with a plurality of coulter wheel assemblies, one for each plow tooth 5, adapted to engage the ground in front of their respective plow teeth while the plow is being pulled through a field for cutting trash thereby to prevent the plow teeth from becoming fouled (i.e., entangled) in trash as the plow is pulled through the field. Each coulter wheel assembly 27 includes an adjustable mounting bracket 29 (see FIGS. 7 and 9) having an upper shank plate 31 approximately the same thickness (e.g., 1 inch) as the upper shank of plow tooth 5 for reception between a respective pair of frame channels 15. Upper shank plate 31 has a vertically spaced series of mounting holes 33 and channels 15 are provided with a pair of holes spaced for alignment with any two adjacent holes 33 on the upper shank plate 31 for receiving a pair of bolts 35 (see FIG. 9) thereby to fixedly secure the coulter assembly 27 to frame 3 in any of a desired series of predetermined vertical positions relative to the frame. A trailing arm 37 extends rearwardly from shank plate 31 and has an axle 39 cantilevered therefrom. A coulter wheel or disk 41, preferably a rippled coulter wheel, is journalled on the axle by means of suitable bearings or the like. Thus, with the plow at its desired plowing depth, the coulter wheel assembly may be readily adjusted relative to the frame so that coulter wheels 41 are in engagement with the ground so as to cut through all types of foliage or field trash in front of their respective plow teeth as the plow is pulled through the field. It will be understood that in place of the above-described rigidly mounted coulter wheel assembly that a spring-mounted assembly (not shown) may be used in which the coulter wheels are spring biased into cutting engagement with the ground so that they are free to flex against the bias of a spring in the event the coulter wheel encounters an obstruction or an irregularity in the field.

Plow 1 also may be optionally provided with a pair of gauge wheel assemblies 43 for engagement with the ground as the plow is pulled through a field thereby to assist in maintaining the plow teeth at a desired plowing depth. As shown in FIGS. 1 and 3, these gauge wheel assemblies are located on opposite sides of the longitudinal center line of plow frame 3 and each comprises an adjustable strut 45 for adjustably mounting a pair of dual gauge wheels 47 on frame 3 whereby the gauge wheels may be moved vertically relative to the frame so as to adjust the depth at which plow teeth 5 penetrate the ground and to maintain the plow teeth at this desired depth. Thus, by adjusting the gauge wheels and the tractor hitch, the plow may be maintained at a position to plow at any depth up to the maximum depth of the plow. It will be understood that the shape of teeth 5 permit the plow of the present invention to plow at depths up to 26 inches (66 cm.).

As shown in FIG. 8, strut 45 comprises a pair of spaced strut plates 49a, 49b each having a series of holes 51 therein and having a spindle holding tube 53 secured to the lower ends of the strut plate for receiving a pair of axle spindles 55 (only one of which is shown in FIG. 8) on which the gauge wheels 47 are journalled by means of anti-friction bearings or the like. The axle spindles are secured to the holding tube by means of removable pins 57. A pair of brackets 59a, 59b is secured (e.g., welded) to one pair of frame channels 15, preferably the pair of frame channels next to the outermost pair of frame channels, and are so structured as to slidably receive strut plates 49a, 49b for up and down movement of the strut plates relative to the mounting brackets. Each of the mounting brackets has a series of holes 61 one of which may be aligned with a hole 51 in a respective strut plate 49a, 49b whereby the strut plates may be fixedly secured to the mounting brackets and thus to frame 3 by pins 63 inserted through the holes 51 and 61 in alignment with one another. Strut 45 further comprises an adjustment screw assembly 65 including a cap plate 66 secured to the upper ends of strut plates 49a, 49b by bolts 67. The cap plate has a downwardly extending adjustable screw 69 captively secured thereto to a nut 71 fixed on the adjustment screw and disposed on the upper face of the cap plate. A pair of adjustable plates 73a, 73b is threaded onto the adjustment screw, these plates being engageable with the top and bottom faces of channels 15 whereby with pins 63 removed from brackets 59a, 59b, rotation of nut 71 will effect rotation of adjustment screw 69 which in turn causes up or down movement of strut plates 49a, 49b tied thereto and the gauge wheels carried by the strut plates relative to frame 3. With the relative position of holes 51 in the strut plates and of holes 61 in brackets 59a, 59b, the gauge wheels can be moved vertically to virtually any desired height relative to the frame and may be fixedly secured to the frame by pins 63. Thus, adjustment screw 69 provides infinite adjustment capability of the gauge wheels relative to the frame and permits the depth at which plow teeth 5 penetrate the earth to be readily adjusted but yet when the gauge wheels are fixedly secured to the frame by pins 63, the adjustment screw does not carry any of the loading of the gauge wheels as the plow is moved through a field and as the gauge wheels encounter uneven ground or obstructions.

Further in accordance with this invention, hitch 7 enables the plow to be attached to any tractor equipped with either a category 2 or 3N, or a category 3 three point hitch with or without an automatic coupler. Generally, hitches on tractors and implements are standardized by tractor and implement manufacturers so that any make of tractor having a category 2 hitch may be coupled to any implement adapted to receive a category 2 hitch and likewise any tractor having a category 3 hitch may be coupled to any implement intended for use with a category 3 hitch. Generally, category 2 hitches are more narrow than a category 3 hitch and are not designed to take the higher loading that may be exerted with a category 3 hitch. Whether the hitch is a category 2 or category 3 hitch, the tractor hitch structure, as generally indicated at 74 in FIGS. 9 and 10, comprises an inverted U-shaped implement coupling frame 75 having two spaced lower implement hooks 77a, 77b and an upper center implement hook 79. These hooks may be optionally provided with coupling pins 80 which are automatically deployed upon the implement hooks engaging the hitch pins on the implement so as to capture the hitch pins and to hold the implement captive on the hooks. A pair of draft links 81a, 81b is pivotally secured to the ends of the implement coupling frame adjacent the lower implement hooks 77a, 77b and to the frame of the tractor. An adjustable center link 83 is pivotally secured to the implement coupling frame adjacent the center hook 79 and to the tractor frame. The implement frame is raised and lowered by means of a hydraulic actuator (not shown) interconnected to the implement frame by means of a rock shaft 85 and by adjustable lift links 87a, 87b pivotally secured to the draft links.

More particularly, hitch 7 on plow 1 is shown to comprise a pair of spaced lower hitch brackets 89a, 89b, each comprising a pair of inner and outer plates 91 and 93, respectively, secured (e.g., welded) to the front face of transverse main beam 23 with the inner plates 91 of the pairs of plates being spaced from one another so that the lower coupling hooks 77a, 77b of a category 2 hitch will comfortably fit between the outer faces of these inner plates. Outer plates 93 are spaced from one another a distance sufficient to permit the lower coupling hooks of a category 3 hitch to fit comfortably between their inner faces. Each of the brackets further comprises a mounting plate 95 secured to transverse main frame beam 23 intermediate each pair of inner and outer plates 91 and 93. The mounting plate removably carries a divider plate 97, the latter being bolted to the mounting plate by bolts 99. Inner and outer plates 91 and 93 and divider plate 97 each have holes therein for reception of a hitch pin 101.

As shown in FIG. 6, hitch pin 101 is generally of the diameter required for use with a category 3 hitch or with a category 2 hitch equipped with an automatic coupler (e.g., the hitch pin has an outer diameter of 1 7/16 in. or 3.65 cm). The hitch pin further has a smaller diameter portion 103 for engagement with coupling hooks 77a, 77b of a category 2 hitch not equipped with an automatic coupler. A T-handle 105 is provided at one end of the hitch pin and a removable clevis pin 107 (FIG. 3) is insertable through a diametric hole 109 in the other end of the hitch pin, the T-handle and the clevis pin retaining the hitch pin in hitch brackets 89a, 89b.

Hitch 7 further comprises a center hitch mast, generally indicated at 111, secured (i.e., welded) to the upper face of transverse beam 23 (see FIG. 3). This hitch mast comprises a pair of spaced plates 113 (see FIGS. 4 and 5) each having a lower hole 115 and an upper hole 115' for reception of a hitch pin bolt 117. Another bolt 119 having a spacer sleeve 121 thereon rigidly joins the upper ends of plates 113 and the spacer sleeve holds the upper ends of the plates in desired spaced relation.

With divider plates 97 bolted to the inside faces of their respective mounting plates 95 and with hitch pins 101 inserted in lower hitch brackets 89a, 89b and with hitch bolt 117 inserted in lower holes 115 of the upper hitch mast 111 (as shown in FIG. 4), a conventional category 2 three point tractor hitch with an automatic coupler or a category 3N hitch with or without an automatic coupler may readily be hitched to the plow. By reversing hitch pins 101 in the lower hitch brackets 89a, 89b so that the smaller diameter portions 103 of the hitch pins are disposed between their respective inner plates 91 and divider plates 97 (not shown), a category 2 tractor hitch without an automatic coupler (which requires smaller diameter lower hitch pins) may readily be coupled to plow 1. With hitch pins 101 and divider plates 97 in the position shown in FIG. 5 and with upper hitch bolt 117 in the upper holes 115' of the center hitch mast 111, hitch 7 may readily be coupled to a tractor having a category 3 hitch either with or without an automatic coupler. It will be understood that with the hitch pins 101 and divider plates 97 in the position shown in FIG. 5, any category 3 hitch or a category 2 hitch without an automatic coupler may be coupled to the lower brackets 89a, 89b without moving divider plates 97 or hitch pins 101 and that only the upper hitch bolt 117 need be moved to the appropriate hole 115, 115'. Also, it will be understood that divider plates 97, which are rigidly connected to frame 3 by bolts 99 and by mounting plate 95 support hitch pins 101 intermediate plates 91 and 93 thereby to substantially lower the bending moment applied to the hitch pins by the lower coupling hook 77a, 77b of the tractor hitch as the plow is pulled through the field and thus hitch 7 of the present invention has the same strength as any conventional category 3 hitch. It will be further understood that the above-described hitch 7 may be used on any implement and that merely by using conventional hand tools (e.g., an adjustable wrench) one may readily change divider plates 97, hitch pins 101 and bolt 115 so that any category 2, 3N or 3 tractor hitch with or without an automatic coupler may be hitched to the implement. Further, it can be seen that the implement hitch can readily transmit the drawbar pull of the tractor to the implement without damage to the hitch.

It will be also understood that the plow 1 of this invention utilizing plow teeth 5 adapted to swing up out of the ground without digging in deeper upon failure of the shear bolt holding it in its normal plowing position can be provided with a drawbar hitch rather than a three point hitch.

In view of the above, it will be seen that the several objects of this invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A subsoil plow having a rigid frame, a plurality of plow teeth, means for mounting each of said teeth on the frame in a plowing position, and means for hitching said frame to a tractor or the like, said tractor being adapted to pull the plow through a field with said teeth penetrating the ground to a desired depth, each of said teeth being a generally forward facing member having an upper portion, a downwardly extending shank, and a bottom tip portion, said mounting means comprising pairs of frame members, one pair for each said tooth, spaced for receiving the upper portion of a respective tooth, said tooth being connected to said frame members by safety release means adapted to release said tooth upon application of a predetermined load to said tooth as occasioned upon the tooth striking an object as it is pulled through the field and by a pivot member located directly above said tip portion of the tooth so that in the event said safety release means releases said tooth while the plow is being drawn through the field, said tooth will rotate rearwardly and upwardly about said pivot member up out of the ground without said tip portion moving below its plowing position, said teeth being arranged in a generally V-shaped array with one of the teeth constituting a center tooth being disposed substantially on the longitudinal center line of the plow forward of the other teeth and with at least one pair of said teeth being spaced laterally outwardly and rearwardly of said center tooth, on both sides thereof, said frame comprising a forward main frame member, said pairs of frame members extending rearwardly from said forward main frame member with one pair of said frame members being located substantially on the longitudinal center line of said plow holding said center tooth, said one pair of frame members being shorter than the other pairs of said frame members, and with said other pairs of frame members being spaced equidistantly from one another and each of said other pairs extending rearwardly a distance greater than its inner adjacent pair of said frame members thereby to hold said teeth in said generally V-shaped array.

2. A plow as set forth in claim 1 wherein said pivot member is forward of said frangible safety release member.

3. A plow as set forth in claim 1 wherein said tip portion of said tooth includes a replaceable shoe removably secured thereto.

4. A plow as set forth in claim 1 further comprising a plurality of coulter wheels, one for each said tooth, each of said coulter wheels being adapted to engage the ground in front of its respective tooth for cutting trash in the field so as to prevent said teeth from being fouled by said trash, and means carried by each of said pairs of frame members for adjustably securing a respective coulter wheel to said frame, said securing means being adjustable to vary the height of said coulter wheels relative to said frame.

5. A plow as set forth in claim 1 further comprising means carried by said frame for engagement with the ground as the plow is pulled through the field thereby to maintain said teeth at a desired plowing depth.

6. A plow as set forth in claim 5 wherein said means engageable with the ground comprises a pair of gauge wheel assemblies each comprising at least one gauge wheel on opposite sides of the longitudinal center line of the frame and means carried by said frame for adjustably mounting said gauge wheel on said frame whereby the gauge wheel may be moved vertically with respect to the frame thereby to selectively vary the plowing depth of said teeth, said mounting means comprising a first member stationary relative to the frame, a second member carrying the gauge wheels and being movable relative to the frame and to the first member, a screw member threadably interconnected between said frame and second members for effecting relative movement of the second member relative to said first member and to said frame, and means for positively securing said second member to said first member at any one of a plurality of fixed positions whereby with said gauge wheels in engagement with the ground said screw member is substantially free of loading as the plow is pulled through the field.

7. A plow as set forth in claim 1 wherein said hitch means is adapted for use with a tractor having either a conventional category 2 or 3N or a category 3 three point hitch including a pair of spaced lower coupling hooks and a center coupling hook between and above said lower hooks, said hitch means comprising means secured to said plow frame generally on the longitudinal center line of said plow for receiving said center coupling hook, an upper hitch pin carried by the last-mentioned means for engagement by said center coupling hook, means on each side of the longitudinal center plane of the plow for receiving the lower coupling hooks of the tractor hitch, each of said lower hook receiving means comprising an inner and outer member secured to the frame with the inner members of each of said receiving means being spaced from one another so that the lower coupling hooks of a category 2 or 3N tractor hitch may be positioned adjacent the outer faces thereof and with the outer members of each of said receiving means being spaced from one another so that the lower coupling hooks of a category 3 tractor hitch may be positioned adjacent the inner faces thereof, said lower hook receiving means further comprising a divider member removably secured to said frame between each of said pair of said inner and outer members either in a first position in which it is spaced from its respective said inner member for receiving a lower coupling hook of either a category 2 or 3N tractor hitch or in a second position in which it is spaced from the inner face of its respective said outer member for receiving a lower coupling hook of a category 3 hitch, and a lower hitch pin carried by each of said lower hook receiving means, said inner, outer and divider members each having a hole therethrough for receiving a respective said lower hitch pin whereby with the divider members secured to the frame in their said first position, the lower coupling hooks of a category 2 or 3N hitch may be readily received between said inner members and said divider members and with said divider members secured to said frame in their second position the lower coupling hooks of a category 3 hitch may be readily received between said outer members and said divider members.

8. A plow as set forth in claim 7 further comprising a generally vertical mounting plate rigidly secured to said frame intermediate each pair of said inner and outer members, said divider member, when in its said first position, being removably secured to the face of said mounting plate toward said inner member and, when in its second position, being removably secured to the other face of said mounting plate.

9. A plow as set forth in claim 7 wherein said means for receiving said center coupling hook comprises a pair of spaced mounting members centered substantially on the longitudinal center line of said plow carrying said upper hitch pin in a first position for engagement by the center coupling hook of a category 2 hitch or in a second position for engagement by the center coupling hook of a category 3 hitch.

* * * * *